(12) United States Patent
Kuroda (10) Patent No.: US 10,168,609 B2
(45) Date of Patent: Jan. 1, 2019

(54) PROJECTION LENS AND PROJECTOR

(71) Applicant: FUJIFILM Corporation, Tokyo (JP)

(72) Inventor: Yasuto Kuroda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/938,093

(22) Filed: Mar. 28, 2018

(65) Prior Publication Data

US 2018/0217489 A1 Aug. 2, 2018

Related U.S. Application Data

(63) Continuation of application No. PCT/JP2016/076639, filed on Sep. 9, 2016.

(30) Foreign Application Priority Data

Sep. 29, 2015 (JP) ................................. 2015-192002

(51) Int. Cl.
*G02B 7/02* (2006.01)
*G03B 21/28* (2006.01)
(Continued)

(52) U.S. Cl.
CPC ............... *G03B 21/28* (2013.01); *G02B 7/02* (2013.01); *G02B 27/0955* (2013.01); *G03B 21/00* (2013.01); *G03B 21/14* (2013.01)

(58) Field of Classification Search
CPC ........... G02B 7/02; G03B 21/00; G03B 21/14
See application file for complete search history.

(56) References Cited

U.S. PATENT DOCUMENTS

2004/0233394 A1* 11/2004 Gohman ................ G02B 13/06
353/70
2004/0257539 A1 12/2004 Peterson et al.
(Continued)

FOREIGN PATENT DOCUMENTS

JP    2006-330410 A    12/2006
JP    2007-525700 A    9/2007
(Continued)

OTHER PUBLICATIONS

International Preliminary Report on Patentability and Written Opinion of the International Searching Authority (Forms PCT/IB/326, PCT/IB/373 and PCT/ISA/237) dated Apr. 12, 2018, for corresponding International Application No. PCT/JP2016/076639, with an English Translation of the Written Opinion.
(Continued)

*Primary Examiner* — Toan Ton
*Assistant Examiner* — Danell L Owens
(74) *Attorney, Agent, or Firm* — Birch, Stewart, Kolasch & Birch, LLP (57) ABSTRACT

A first holding member holds a first optical system and a first mirror, and has a first junction surface. A second holding member holds a second optical system and a second mirror, and has a second junction surface. A junction portion is configured such that, in a state where the first junction surface and the second junction surface are aligned with each other, the second holding member is capable of being shifted in a direction of both the junction surfaces and rotated around an optical axis, and makes it possible to perform optical axis alignment. An emission-side optical axis of the first optical system and an incidence-side optical axis of the second optical system are aligned with each other, and thus a U-shaped optical path is formed by the first and second optical systems.

10 Claims, 9 Drawing Sheets

(51) Int. Cl.
*G03B 21/00* (2006.01)
*G03B 21/14* (2006.01)
*G02B 27/09* (2006.01)

(56) References Cited

U.S. PATENT DOCUMENTS

| | | |
|---|---|---|
| 2008/0291552 A1 | 11/2008 | Nogami |
| 2009/0116124 A1 | 5/2009 | Minefuji |
| 2010/0128234 A1 | 5/2010 | Nishikawa |
| 2010/0245784 A1 | 9/2010 | Nishikawa |
| 2011/0002034 A1 | 1/2011 | Shimo et al. |

FOREIGN PATENT DOCUMENTS

| | | |
|---|---|---|
| JP | 2008-203540 A | 9/2008 |
| JP | 2009-134254 A | 6/2009 |
| JP | 2010-122573 A | 6/2010 |
| JP | 2010-237356 A | 10/2010 |
| WO | WO 2009/107553 A1 | 9/2009 |

OTHER PUBLICATIONS

International Search Report (Form PCT/ISA/210) dated Dec. 6, 2016, for corresponding International Application No. PCT/JP2016/076639, with English Translation.

\* cited by examiner

PROJECTION LENS AND PROJECTOR

CROSS-REFERENCE TO RELATED APPLICATIONS

This application is a Continuation of PCT International Application No. PCT/JP2016/076639 filed on 9 Sep. 2016, which claims priority under 35 U.S.C § 119(a) to Japanese Patent Application No. 2015-192002 filed on 29 Sep. 2015. The above application is hereby expressly incorporated by reference, in its entirety, into the present application.

BACKGROUND OF THE INVENTION

1. Field of the Invention

The present invention relates to a projection lens and a projector.

2. Description of the Related Art

In recent years, projectors having an image forming panel such as a liquid crystal display device or a digital micromirror device (DMD) mounted therein have been in widespread use and have increased in performance. Particularly, with an improvement in the resolution of the image forming panel, there has also been a demand for an improvement in the resolution performance of a projection optical system.

In addition, in consideration of improving the degree of freedom of the setting of distance to a screen or installability in an indoor space, there has been a strong demand for mounting a projection optical system having high versatility, in which higher performance and a wider angle are achieved with a compact configuration, in a projector.

In order to respond to such a demand, a projection optical system is proposed in which an intermediate image is formed in a first optical system consisting of a plurality of lenses, and the image is re-formed in a second optical system likewise consisting of a plurality of lenses (see WO09/107553A (corresponding to US 2011/002034A1) and JP2006-330410A).

In a projection optical system composed of only an optical system having no normal intermediate image formed thereon, in a case where an attempt is made to widen an angle by reducing a focal length, a lens on the magnified side becomes excessively large. On the other hand, in a projection optical system of a type in which intermediate imaging is performed, it is possible to shorten the back focus of a second optical system, and to reduce the lens diameter of the second optical system on the magnified side. Therefore, the system is also suitable for widening an angle by reducing a focal length.

As a projector having a mirror incorporated into a projection optical system, a rear projector of which the optical axis is bent is proposed (see JP2008-203540A (corresponding to US 2008/291552A1)). In this rear projector, when a projection lens unit is assembled which consists of a convergence optical system, a mirror, a magnification optical system, and a lens housing having these components integrally incorporated thereinto, the position of the mirror is adjusted and then the mirror is fixed with an adhesive. Thereby, even in a case where a mirror holding portion of the lens housing is not processed with a high degree of accuracy, the mirror is accurately fixed.

SUMMARY OF THE INVENTION

However, WO09/107553A and JP2006-330410A have an adverse effect that the entire lens length increases due to an intermediate image being formed one time. For this reason, the projection optical system as disclosed in WO09/107553A and JP2006-330410A are not able to be used, as it is, in a projector having a requirement for compactness.

In JP2008-203540A, compactness is achieved by disposing a mirror between a convergence optical system and a magnification optical system to bend an optical axis. However, a length in a traverse direction, for example, is shortened as much as the optical axis is bent simply by inserting one mirror, but a length in a longitudinal direction is lengthened as much as the optical axis is bent, which leads to no achievement in compactness in a longitudinal direction. Further, since the optical axis and a screen surface are not at right angles to each other, there is a need for a mirror for bending a ray of light emitted from a front lens element which is a distal end lens of the projection lens.

The present invention is contrived in view of such circumstances, and an object thereof is to provide a projection lens and a projector which are capable of being accurately assembled while achieving a reduction in size, and are capable of widening an angle by reducing a focal length.

In order to achieve the above object, according to the present invention, there is provided a projection lens comprising a first optical system, a first optical axis bending member, a second optical system, a second optical axis bending member, a first holding member, a second holding member, a first junction surface, a second junction surface, and a junction portion. The first optical axis bending member is disposed between the first optical system and an image forming surface of the first optical system, and bends an optical axis. The second optical system projects an image formed by the first optical system onto a projection surface. The second optical axis bending member is disposed in the second optical system and bends an optical axis. The first holding member integrally holds the first optical system and the first optical axis bending member. The second holding member integrally holds the second optical system and the second optical axis bending member. The first junction surface intersects an emission-side optical axis of the first optical system and is formed in the first holding member. The second junction surface intersects an incidence-side optical axis of the second optical system and is formed in the second holding member. The junction portion is configured such that, in a state where the first junction surface and the second junction surface are aligned with each other, at least one of the first holding member and the second holding member is capable of being shifted in a direction of both the junction surfaces and rotated around the optical axis with respect to the other holding member. The junction portion is configured such that a U-shaped optical path is formed by optical axis alignment between an emission side of the first optical system and an incidence side of the second optical system.

It is preferable that the junction portion includes a screw hole, a mounting hole, and a mounting screw. The screw hole is provided in one of the first holding member and the second holding member. The mounting screw is provided in the other of the first holding member and the second holding member. The mounting screw is inserted from the mounting hole and screwed to the screw hole, and fixes the first holding member and the second holding member in a state where the first junction surface and the second junction surface are closely attached to each other. The junction portion is configured such that the first holding member and the second holding member are relatively shifted in the direction of both the junction surfaces and are rotated around the optical axis, within a gap between the mounting hole and the mounting screw.

It is preferable that the junction portion includes an intermediate member, a first mounting screw, and a second mounting screw. The intermediate member is configured such that the first holding member and the second holding member are relatively shifted in the direction of both the junction surfaces and are rotated around the optical axis, between the first junction surface and the second junction surface. The first mounting screw fixes the intermediate member to the first junction surface by performing one of a shift and rotation around the optical axis between the first junction surface and the intermediate member. The second mounting screw fixes the intermediate member to the second junction surface by performing the other of a shift and rotation around the optical axis between the intermediate member and the second junction surface.

It is preferable that the junction portion includes an intermediate mount, and that the second holding member is detachably mounted to the intermediate mount. The intermediate mount is closely attached to the first junction surface, and has a second junction surface.

According to the present invention, there is provided a projector comprising an image forming panel that displays an image, a light source that illuminates the image forming panel, and the projection lens that projects illumination light, from the image forming panel illuminated by the light source, onto a projection surface.

In addition, according to the present invention, there is provided a projector comprising a projector main body including an image forming panel that displays an image and a light source that illuminates the image forming panel, and the projection lens, detachably mounted to the projector main body, which projects illumination light from the image forming panel illuminated by the light source.

It is preferable that the image forming panel is disposed such that a center of the image forming panel is shifted with respect to the optical axis of the first optical system. In addition, it is preferable that the image forming panel is disposed such that a center of the image forming panel is shifted with respect to the optical axis of the first optical system in a direction of the optical axis bent by the first optical axis bending member.

According to the present invention, it is possible to provide a projection lens and a projector which are capable of being accurately assembled while achieving a reduction in size, and are capable of widening an angle by reducing a focal length.

DESCRIPTION OF THE PREFERRED EMBODIMENTS

First Embodiment

Figure 1:
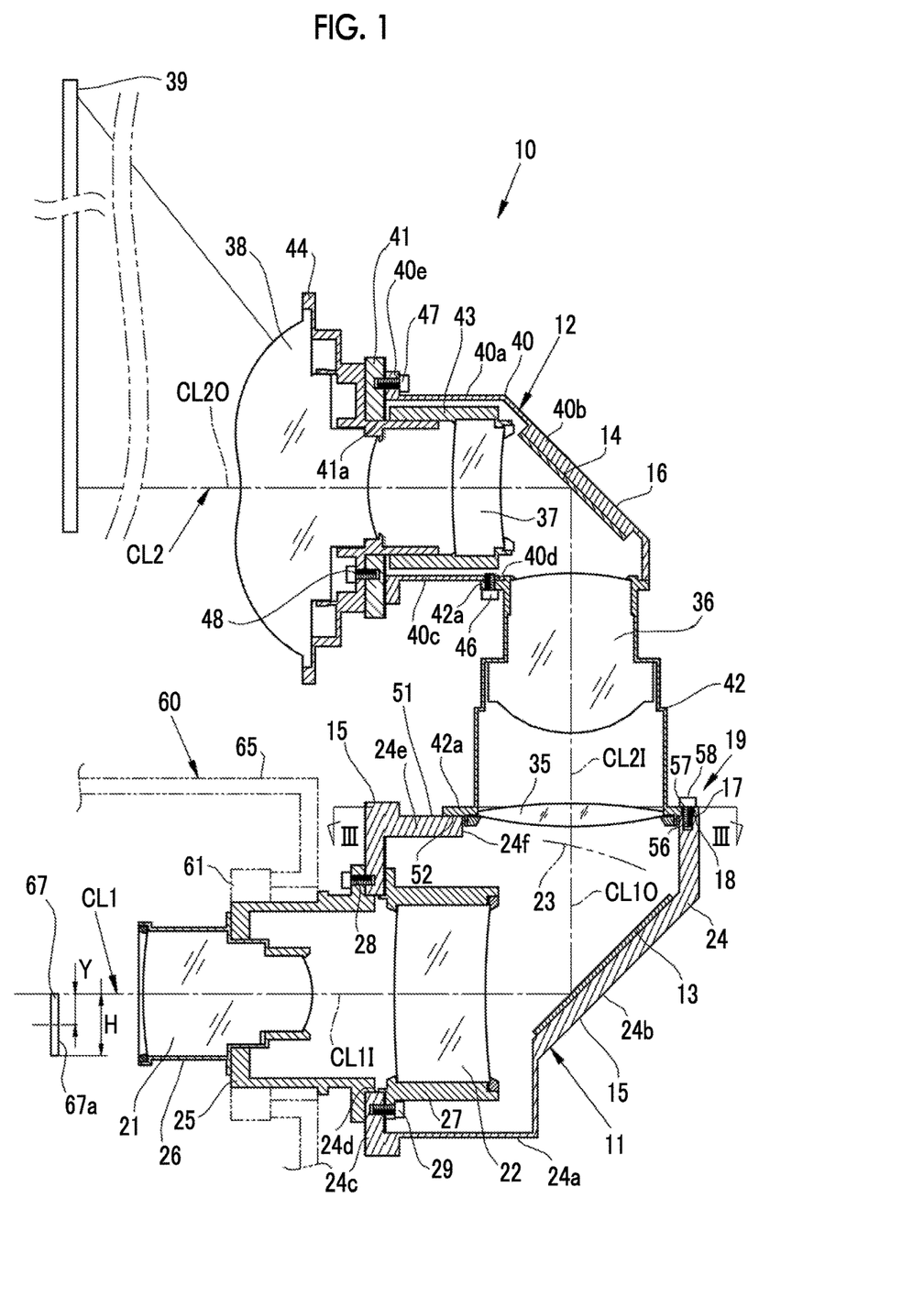
FIG. 1 is a longitudinal cross-sectional view illustrating a projection lens of a first embodiment of the present invention.

As shown in FIG. 1, a projection lens 10 of the present embodiment includes a first optical system 11, a second optical system 12, a first mirror 13 as a first optical axis bending member, a second mirror 14 as a second optical axis bending member, a first holding member 15, a second holding member 16, a first junction surface 17, a second junction surface 18, and a junction portion 19.

The first optical system 11 is composed of a first lens 21 and a second lens 22. The first lens 21 and the second lens 22 are displayed as a single lens for the purpose of simplifying the illustration, but are actually composed of a plurality of lens groups. The first optical system 11 forms an image of an image forming panel 67, as an intermediate image, on an image forming surface 23.

The first mirror 13 is disposed between the first optical system 11 and the image forming surface 23 of the intermediate image formed by the first optical system 11. The first mirror 13 reflects projection light by bending an optical axis CL1 of the first optical system by 90°.

The first holding member 15 integrally holds the first optical system 11 and the first mirror 13. The first holding member 15 includes a first main body 24, a mounting cylinder 25, a first lens frame 26, and a second lens frame 27. The first main body 24 is constituted by a square cylinder having a substantially rectangular shape. One corner of a lower plate 24a of the first main body 24 is cut out obliquely, and an inclination portion 24b is formed. The first mirror is fixed onto the inside surface of the inclination portion 24b.

A first mounting hole 24d of the first optical system 11 is formed in an entrance-side front plate 24c facing the inclination portion 24b. The mounting cylinder 25, the first lens frame 26, and the second lens frame 27 are mounted to this first mounting hole 24d by mounting screws 28 and 29. The respective mounting screws 28 and 29 are disposed, for example, at a pitch of 120° on the hole edge of the first mounting hole 24d in a circumferential direction. In the present embodiment, another mounting screw described later is similarly disposed, for example, at a pitch of 120° on the hole edge in a circumferential direction. One or more mounting screws may be used. In addition, both may be fixed to each other using an adhesive, instead of the mounting screws 28 and 29 and the like, or in addition thereto. A second mounting hole 24f is formed in an upper plate 24e of the first main body 24 of the first holding member 15.

The second optical system 12 is composed of a third lens 35, a fourth lens 36, a fifth lens 37, and a sixth lens 38. The fourth lens 36 to the sixth lens 38 are displayed as a single lens for the purpose of simplifying the illustration, but are actually composed of a plurality of lens groups. The second optical system 12 magnifies the intermediate image formed on the image forming surface 23 by the first optical system 11, and projects the magnified image onto, for example, a screen 39 which is an object to be projected. Meanwhile, the first optical system 11 and the second optical system 12 are described in detail in "Optical System for Projection and Projection-type Display Device" of, for example, JP2015-035085, JP2015-045989 and the like, and optical systems disclosed therein can be used as the first optical system 11 and the second optical system 12. According to the optical system for projection and the projection-type display device, an optical system is obtained which has high projection performance and in which various aberrations are satisfactorily corrected with a wide angle.

The second mirror 14 is disposed between the third lens 35 and the fourth lens 36 of the second optical system 12. The second mirror 14 reflects projection light by bending an optical axis CL2 of the second optical system 12 by 90°.

The second holding member 16 integrally holds the second optical system 12 and the second mirror 14. The second holding member 16 includes a second main body 40, a mounting plate 41, a third lens frame 42, a fourth lens frame 43, and a fifth lens frame 44. The second main body 40 is constituted by a square cylinder having a substantially rectangular shape. One corner of an upper plate 40a of the second main body 40 is cut out obliquely, and an inclination portion 40b is formed. The second mirror 14 is fixed onto the inside surface of the inclination portion 40b.

A third mounting hole 40d is formed on a lower plate 40c, located on the lower side, which faces the inclination portion 40b in a vertical direction. The emission-side end face of the third lens frame 42 is inserted into this third mounting hole 40d from a vertically downward direction. A flange 42a is formed on the emission-side end face of the third lens frame 42. The flange 42a and the lower plate 40c are fixed to each other by a mounting screw 46.

A flange 40e is extensively provided on a front end face facing the inclination portion 40b in a horizontal direction. The mounting plate 41 is fixed to this flange 40e by a mounting screw 47. The mounting plate 41 has a mounting hole 41a. The fifth lens frame 44 that holds the sixth lens 38 is inserted into the mounting hole 41a. The fifth lens frame 44 is fixed to the mounting plate 41 by a mounting screw 48. The fourth lens frame 43 is externally fitted to the incidence-side end of the fifth lens frame 44 and is movably mounted in the direction of an emission-side optical axis CL2O of the second optical system 12.

Figure 2:
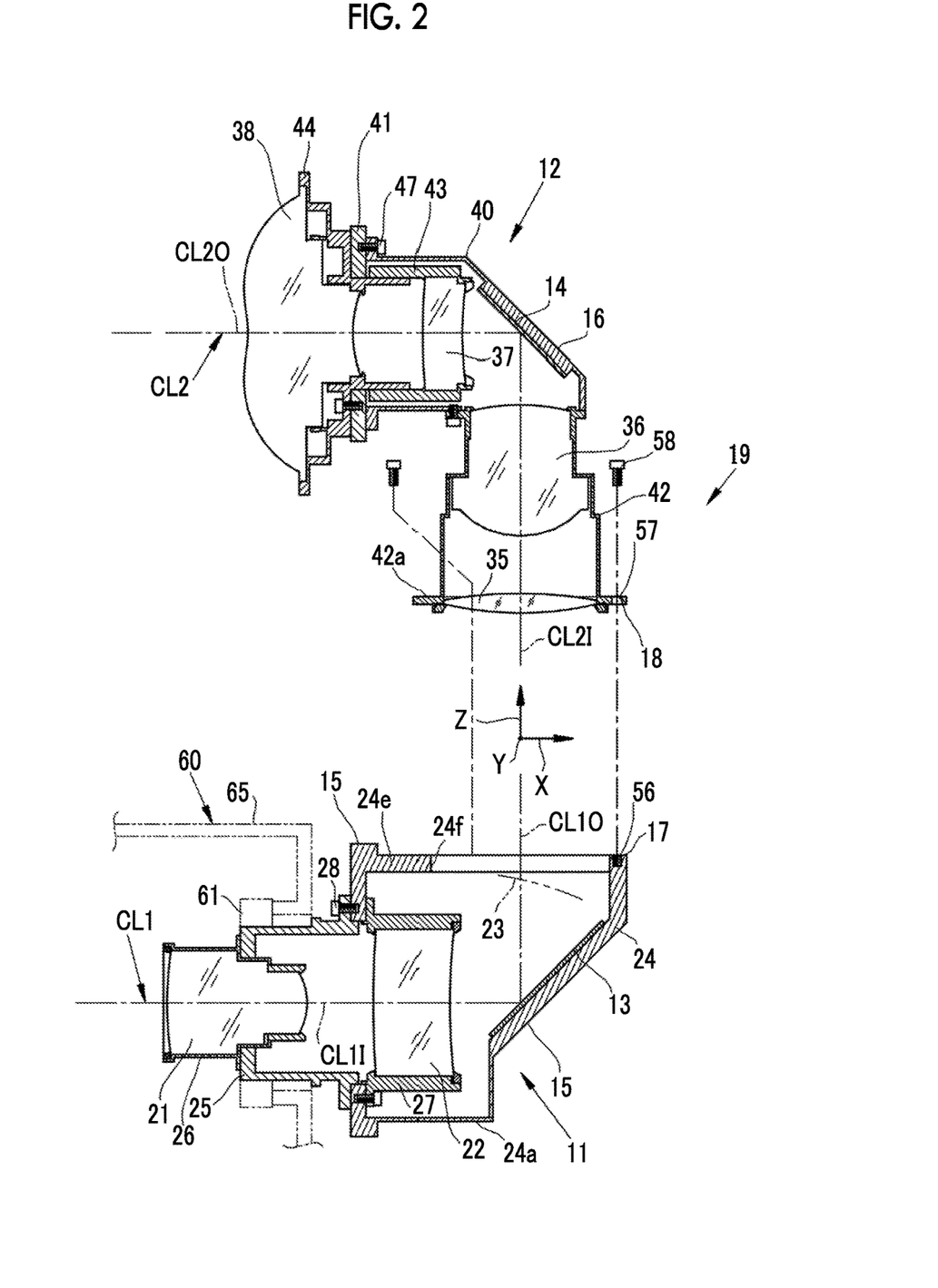
FIG. 2 is a longitudinal cross-sectional view illustrating a state where a second holding member is mounted to a first holding member.

As shown in FIG. 2, the first junction surface 17 is formed on the upper plate 24e of the first holding member 15 so as to be at right angles to an emission-side optical axis CL1O of the first optical system 11. In addition, the second junction surface 18 is formed on the flange 42a of the third lens frame 42 of the second holding member 16 so as to be at right angles to an incidence-side optical axis CL2I of the second optical system 12.

The first holding member 15 and the second holding member 16 are individually assembled. In a case where the assembly of the first optical system 11 is completed, an incidence-side optical axis CL1I of the first optical system 11 is bent by 90° following reflection from the first mirror 13, and serves as the emission-side optical axis CL1O. In addition, the first junction surface 17 is at right angles to the emission-side optical axis CL1O of the first optical system 11. Similarly, in a case where the assembly of the second optical system 12 is completed, the incidence-side optical axis CL2I of the second optical system 12 is bent by 90° following reflection from the second mirror 14, and serves as the emission-side optical axis CL2O. In addition, the second junction surface 18 is at right angles to the incidence-side optical axis CL2I of the second optical system 12. Meanwhile, the first junction surface 17 is at right angles to the optical axis CL1O, and the second junction surface 18 is at right angles to the optical axis CL2I, but both the junction surfaces may intersect the respective optical axes CL1O and CL2I at constant angles instead of the right angles.

As shown in FIG. 1, the first holding member 15 and the second holding member 16 are assembled by the junction portion 19 in a state where the first junction surface 17 and the second junction surface 18 are closely attached to each other. The junction portion 19 is configured such that, in a state where the first junction surface 17 and the second junction surface 18 are aligned with each other, at least one of the first holding member 15 and the second holding member 16 is shifted in the direction of both the junction surfaces 17 and 18 and is rotatable around the optical axis CL1O with respect to the other. Thereby, the emission-side optical axis CL1O of the first optical system 11 and the incidence-side optical axis CL2I of the second optical system 12 are aligned with each other. On the optical axes CL1O and CL2I aligned with each other, a U-shaped optical path is formed by the incidence-side optical axis CL1I of the first optical system 11 and the emission-side optical axis CL2O of the second optical system 12.

Figure 3:
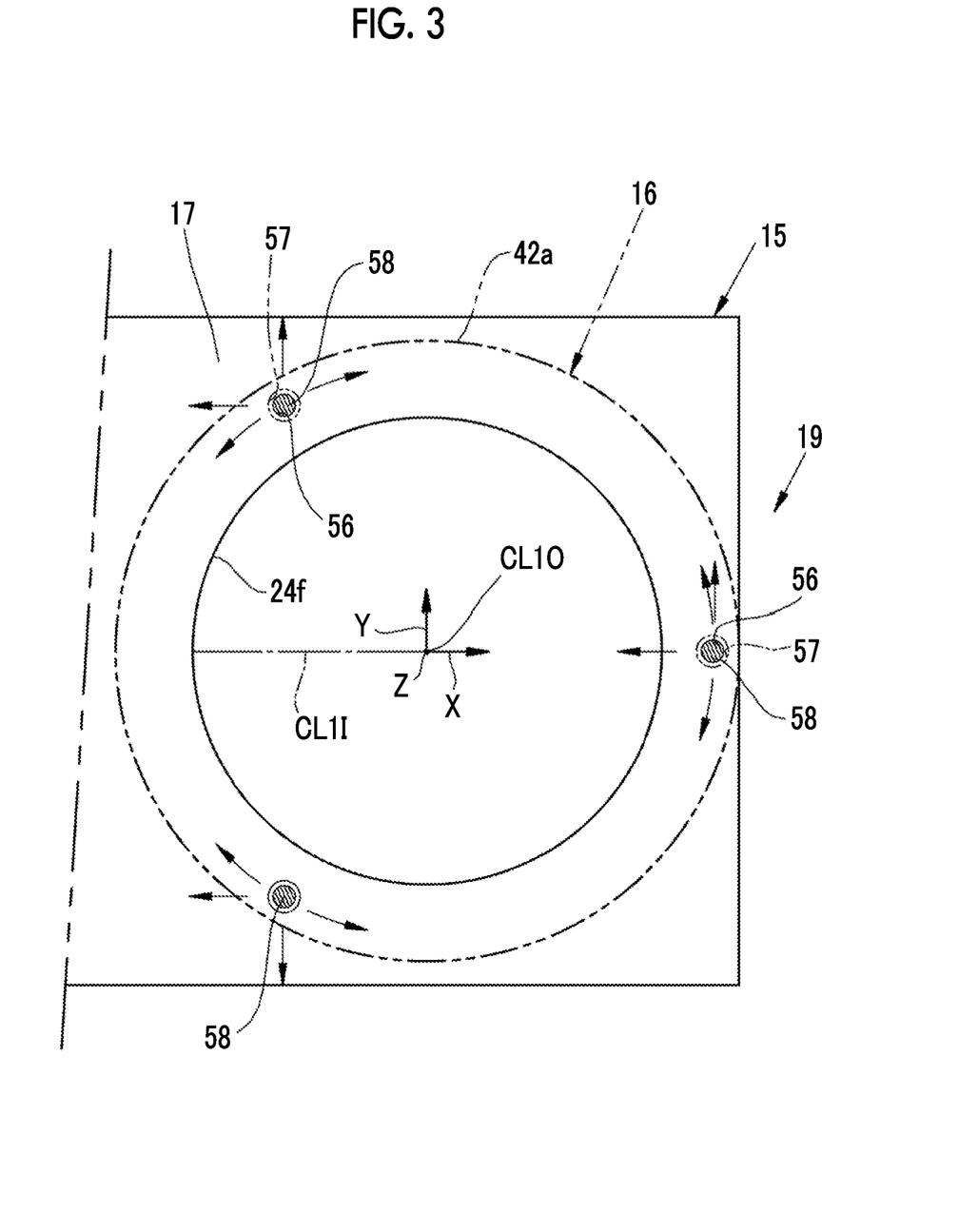
FIG. 3 is a cross-sectional view taken along line III-III in FIG. 1.

As shown in FIG. 3, the junction portion 19 includes a screw hole 56, a screw mounting hole 57, and a mounting screw 58. The screw hole 56 is provided in one of the first holding member 15 and the second holding member 16. In the present embodiment, the first holding member 15 is provided with the screw hole 56, for example, at a pitch of 120° on the circumference edge of the second mounting hole 24f. The screw mounting hole 57 is provided in the other of the first holding member 15 and the second holding member 16. In the present embodiment, the second holding member 16 is provided with the screw mounting hole 57. The mounting screw 58 is screwed to the screw hole 56 following insertion from the screw mounting hole 57, and fixes the first holding member 15 to the second holding member 16 in a state where the first junction surface 17 and the second junction surface 18 are closely attached to each other.

The diameter of the screw mounting hole 57 is formed to be larger than the diameter of the mounting screw 58, and a gap is formed between the both. Within this gap, the first holding member 15 and the second holding member 16 can be relatively shifted in the direction of both the junction surfaces and be rotated around the optical axis. Therefore, the second holding member 16 is moved (moved in an XY plane) in the direction of the incidence-side optical axis CL1I (hereinafter, called the X-axis direction) of the first optical system 11 and a direction which is at right angles to an X-axis (called the Y-axis direction) in the in-plane of the first junction surface 17 with respect to the first holding member 15, and the emission-side optical axis CL1O of the first optical system 11 and the incidence-side optical axis CL2I of the second optical system 12 are caused to be coincident with a Z-axis direction which is at right angles to the XY plane. In addition, one of the first holding member 15 and the second holding member 16 is rotated around the Z-axis with respect to the other in addition to its shift in an XY direction, and thus the incidence-side optical axis CL1I of the first optical system 11 and the emission-side optical axis CL2O of the second optical system 12 are caused to be coincident with each other. The fine adjustment thereof is performed in a state where the first holding member 15 and the second holding member 16 are relatively movable by loosely fastening the mounting screw 58, and are given a frictional force enough not to lightly move. In a case where the optical axis alignment is terminated, the mounting screw 58 is finally fastened, and the first holding member 15 and the second holding member 16 are formed integrally with each other.

Figure 4:
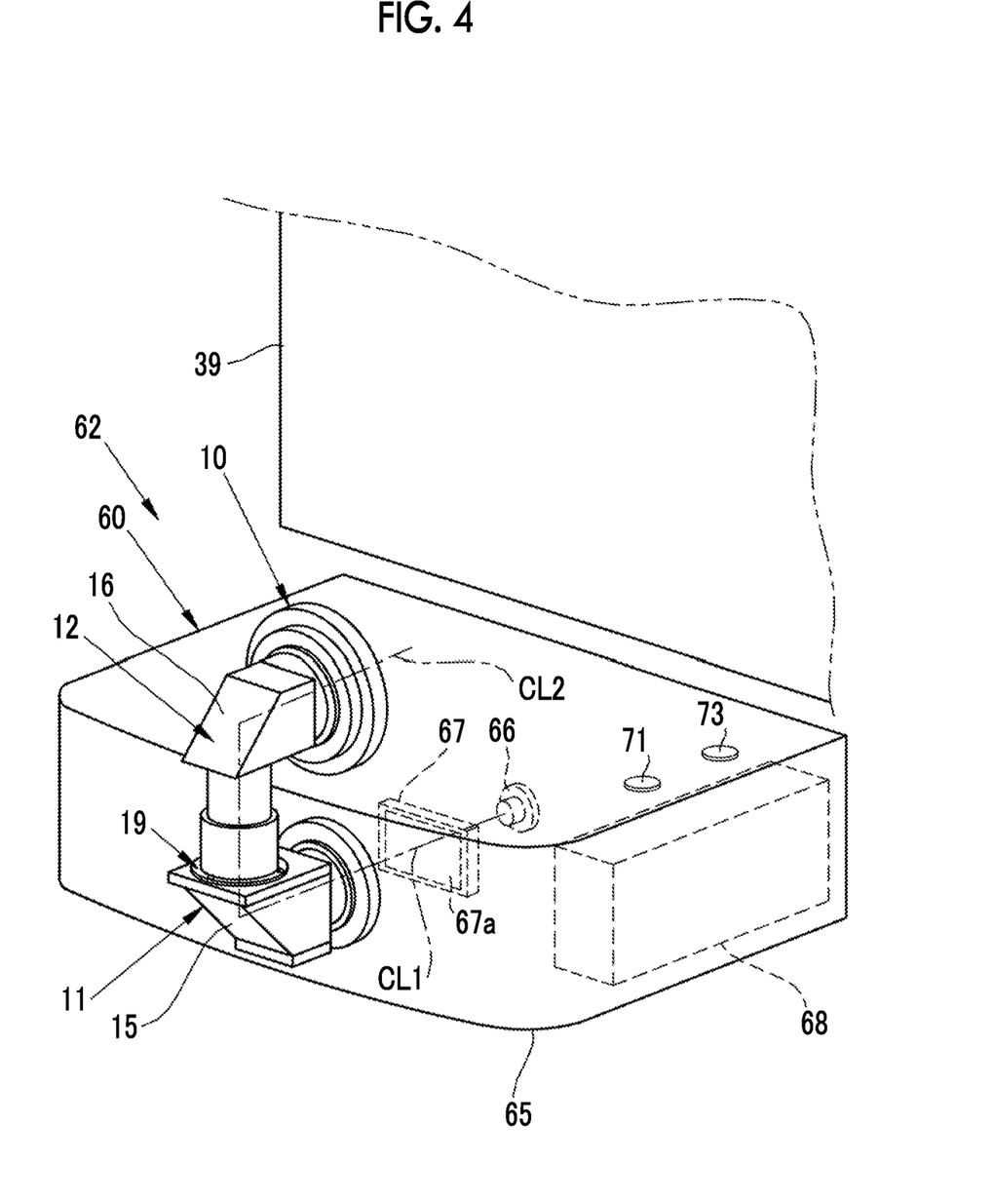
FIG. 4 is a perspective view illustrating a projector having a projection lens mounted to a projector main body.

At the time of the optical axis alignment, as shown in FIG. 4, the projection lens 10 is set up in a projector main body 60 described later, or a tester for optical axis alignment or an exclusive projection instrument configured similarly to this projector main body 60. At the time of the setup, the projection lens 10 is detachably mounted to the projector main body 60 by a mount 61 (see FIG. 1) having a well-known structure. A pattern image of a rectangular frame or any other patterns is displayed on the image forming panel 67. The pattern image displayed on the image forming panel 67 is projected onto the screen 39 by the projection lens 10. In a direction in which inclinations are eliminated when viewing the amount of shift of this projected pattern image from a reference position with respect to, for example, the horizontal line and the vertical line of the rectangular frame, the second holding member 16 is shifted in X-axis direction and the Y-axis direction with respect to the first holding member 15. Thereby, the optical axis alignment in the X-axis and Y-axis directions is performed. In addition, in a case where the rectangular frame projected onto the screen 39 is rotated or distorted in a trapezoidal shape when the rectangular frame is observed, the second holding member 16 is rotated around the optical axis up to a position at which the rotation and distortion of the rectangular frame do not appear. Thereby, the adjustment around the optical axis is completed.

In the optical axis alignment, after the second holding member 16 is rotated and adjusted around the optical axis, the second holding member 16 may be shifted in the XY plane. In addition, the optical axis alignment may be performed by simultaneously performing its shift in the XY plane and its rotation around the optical axis. This optical axis alignment is also performed by a user after product purchase, in addition to being performed at the final stage of a product.

As described above, the first holding member 15 and the second holding member 16 are joined by the junction portion 19 in a state where the first junction surface 17 and the second junction surface 18 are aligned with each other, and thus the projection lens 10 having a U-shaped optical path is assembled.

As shown in FIG. 4, the projection lens 10 is detachably mounted to the projector main body 60 through the mount 61 (see FIG. 1), and a projector 62 is formed. The projector main body 60 has a light source 66, an image forming panel 67, and a control unit 68 received in a case 65 having a substantially rectangular shape.

As the image forming panel 67, a transmission-type liquid crystal panel is used. The light source 66 is installed on the rear surface of the image forming panel 67, that is, the opposite side of the projection lens 10 based on the image forming panel 67. As the light source 66, an LED is used which simultaneously emits three colors of RGB, and illuminates the image forming panel 67. Meanwhile, a xenon lamp that emits white light or a halogen lamp and an ultrahigh-pressure mercury lamp may be used instead of the LED. The projection lens 10 projects illumination light, from the image forming panel 67 illuminated by the light source 66, onto a projection surface, for example, the screen 39.

The control unit 68 turns on the light source 66, and causes an image of three colors of RGB to be displayed on an image forming surface 67a. The control unit 68 also performs the following other processes. When an operation signal of a zoom dial 71 is received, for example, in a case where an electromotive control function is contained in the projection lens 10, the size of an image projected onto the screen 39 is adjusted. When an operation signal of a focus dial 73 is received, a focusing mechanism (not shown) of the projection lens 10 is brought into operation, and the focus of the image projected onto the screen 39 is adjusted.

As shown in FIG. 1, the image is projected onto the screen 39 located further upward than the optical axis CL2O of the projection lens 10. The center of the image forming panel 67 is shifted and fixed to the lower side in a direction opposite to a direction in which the central position of a projected image (projection surface of the screen 39) shifts with respect to the optical axis CL1I of the projection lens 10, that is, the direction of the emission-side optical axis CL1O of the first optical system 11 of the projection lens 10.

Figure 5:
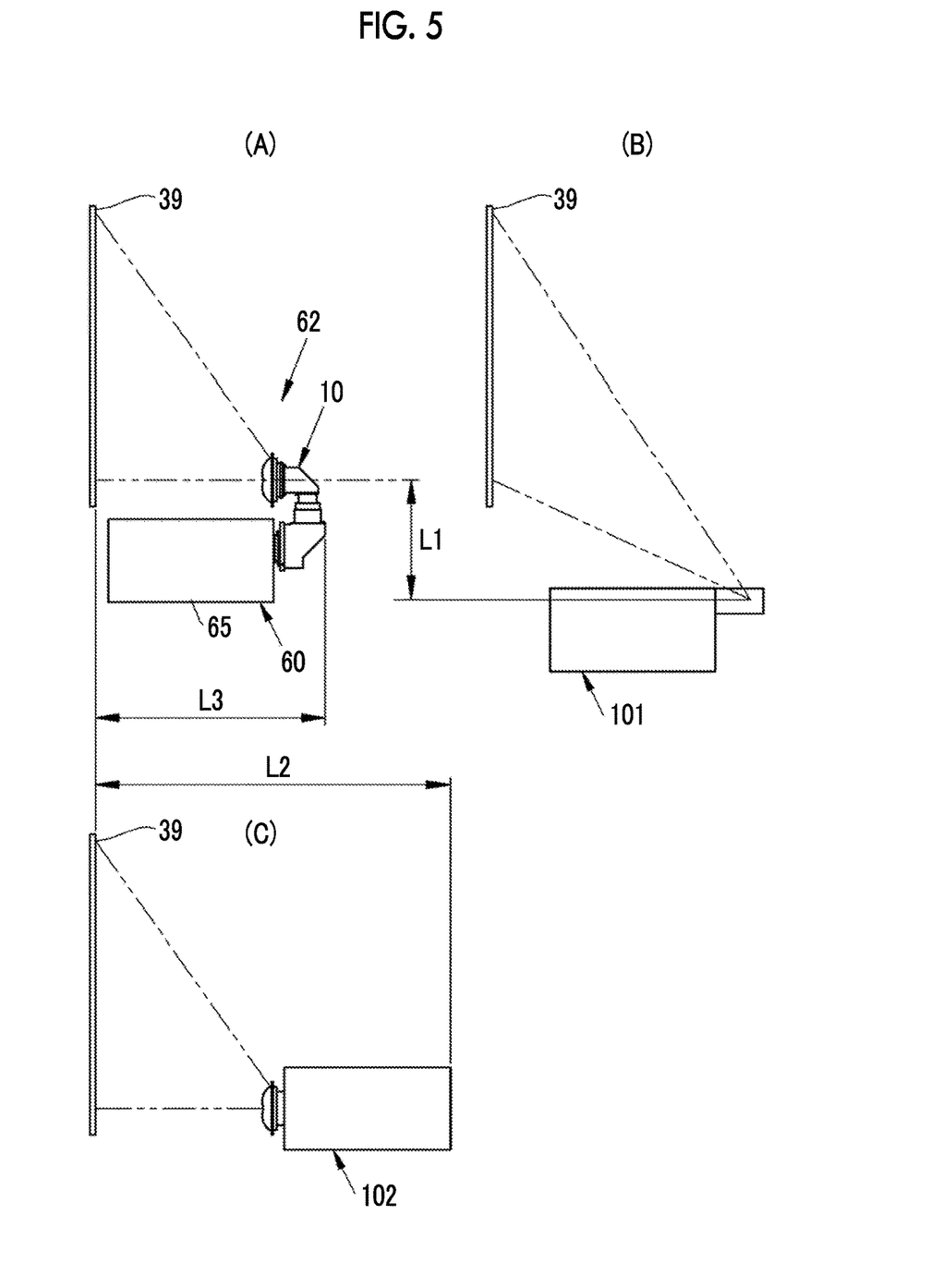
FIG. 5 is a schematic diagram illustrating a comparison between a projection screen and an installation state of a projector of the present invention and a projector of related art.

At the time of use, as shown in (A) of FIG. 5, the image of the image forming panel 67 (see FIG. 1) can be magnified and projected by the projection lens 10 onto the screen 39 installed upward on the rear surface side of the projector 62.

(B) of FIG. 5 shows a projector 101 of a first related art type. This projector 101 has a V-shaped optical path along which an image is projected onto the rear surface side of the projector 101 through one mirror. As compared with this projector 101, a lens shift is possible in the projection lens 10 of the present invention, and thus a projection position can be changed in a state where the projector 62 is fixed. Furthermore, in a case where a shift ratio S is 0.5 as shown in FIG. 1, the emission-side optical axis CL2O of the second optical system 12 of the projection lens 10 and the lower side of a projected image can be caused to be coincident with each other as shown in (A) of FIG. 5. Meanwhile, in a case where a distance from the optical axis to the center of the image forming panel 67 is set to Y, and the length of the image forming panel 67 in the shift direction of the image forming panel 67 is set to H, the shift ratio S is obtained by dividing the distance Y by the length H. Therefore, in the present embodiment, a gap between the emission-side optical axis CL2O of the projection lens 10 and the lower side of the projected image can be set to "0". On the other hand, as shown in (B) of FIG. 5, in the projector 101 of the first related art type, a gap between the projected image and the projection lens cannot be set to "0". For this reason, a gap L1 is necessarily required in the projector 101 of the first related art type. In the present embodiment, the gap can be set to "0", a set length's worth of space securing is not required, and the degree of freedom of installation increases, which leads to an advantage in the installation space. Meanwhile, the lens shift may be performed in a horizontal direction in addition to a vertical direction.

(C) of FIG. 5 shows a projector 102 of a second related art type having an I-shaped optical path in which an optical path is not bent. In this projector 102, a projection distance+a set length's worth of installation space of the projector 102 is as long as a length L2. In the projector 62 of the present embodiment, as shown in (A) of FIG. 5, projection can be performed in the installation space of a set length L3 of the projector 62. Therefore, the installation space can be made smaller to that extent than in the projector 102 of the second related art type, and the degree of freedom of installation also increases.

Meanwhile, in the present embodiment, as shown in FIG. 1, the projection lens 10 is detachably mounted to the projector main body 60 through the mount 61, but the first optical system 11 may be fixed directly to the projector main body 60 instead of the mount 61.

Second Embodiment

In the first embodiment, using a gap between the screw mounting hole 57 provided in the second holding member 16 and the mounting screw 58 screwed to the first holding member 15, the second holding member 16 is shifted in the XY plane with respect to the first holding member 15, and is rotated around the optical axis (Z-axis). On the other hand, in a second embodiment shown in FIG. 6, an intermediate member 80, a first mounting screw 81, and a second mounting screw 82 are provided to form a junction portion 83. In this junction portion 83, shift adjustment in the XY plane and adjustment around the optical axis are separately performed through the intermediate member 80. Meanwhile, the same configuration members as those in the first embodiment are denoted by the same reference numerals and signs, and thus the repeated description thereof will be omitted below.

Figure 6:
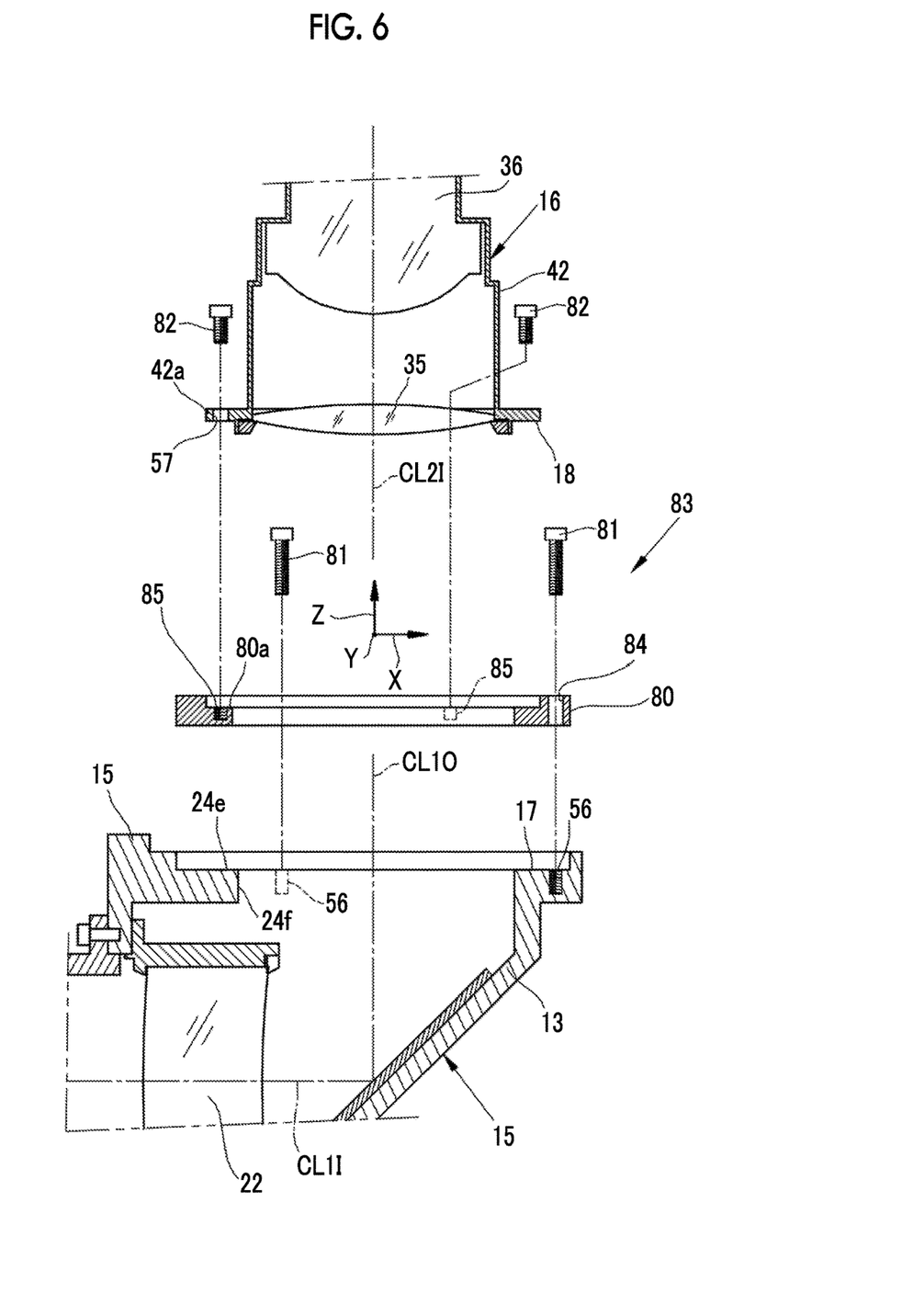
FIG. 6 is an exploded longitudinal cross-sectional view illustrating the periphery of a junction portion of a projection lens of a second embodiment using an intermediate member.

The intermediate member 80 is provided between the first junction surface 17 and the second junction surface 18, and a shift in the XY plane is performed by the first mounting screw 81 between the first holding member 15 and the intermediate member 80. In addition, adjustment around the optical axis is performed by the second mounting screw 82 between the intermediate member 80 and the second holding member 16. Therefore, a gap for shift adjustment within the XY plane is provided between the first holding member 15 and the intermediate member 80. In addition, a gap for adjustment around the optical axis is provided between the intermediate member 80 and the second holding member 16.

The intermediate member 80 is provided with a screw mounting hole 84 in a circumferential direction on the outer circumference edge, for example, at a pitch of 120°. The screw hole 56 is formed on the first junction surface 17 at a position corresponding to the screw mounting hole 84. The first mounting screw 81 is inserted into the screw mounting hole 84 and is screwed to the screw hole 56, whereby the intermediate member 80 is mounted to the first holding member 15. A gap is provided between the first mounting screw 81 and the screw mounting hole 84, and optical axis alignment in the direction of the XY plane is performed by a shift of the intermediate member 80 in the XY plane within a range of this gap. After the completion of the optical axis alignment, the first mounting screw 81 is fastened, and the intermediate member 80 is fixed to the first holding member 15.

An intermediate junction surface 80*a* with which the second junction surface 18 is in contact is formed on the upper surface of the intermediate member 80. A screw hole 85 is formed on the outer circumference edge of the intermediate junction surface 80*a* at a position corresponding to the screw mounting hole 57 of the second holding member 16. The second mounting screw 82 is inserted into the screw mounting hole 57 of the second holding member 16, and is screwed to the screw hole 85, whereby the second holding member 16 is mounted to the intermediate member 80. A gap is provided between the screw mounting hole 57 and the second mounting screw 82, and optical axis alignment around the Z-axis is performed by the second holding member rotating around the Z-axis within a range of this gap. After the completion of the optical axis alignment, the second mounting screw 82 is fastened, and the second holding member 16 is fixed to the intermediate member 80.

Third Embodiment

Figure 7:
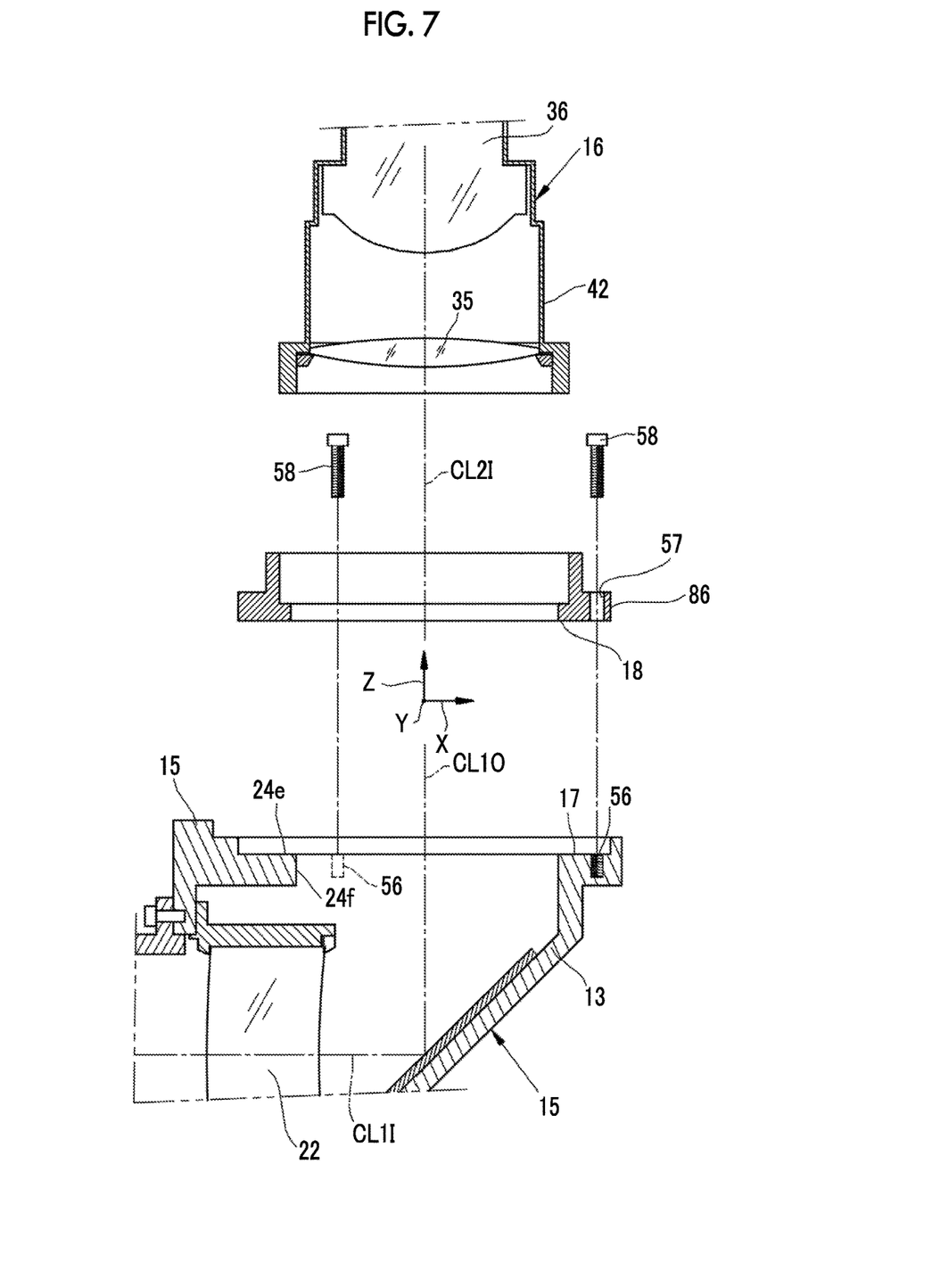
FIG. 7 is an exploded longitudinal cross-sectional view illustrating the periphery of a junction portion of a projection lens of a third embodiment using an intermediate mount.

In a third embodiment shown in FIG. 7, an intermediate mount 86 is provided instead of the intermediate member 80 of the second embodiment. The intermediate mount 86 has a well-known mount structure, and junction between the intermediate mount 86 and the second holding member 16 is detachably performed. The intermediate mount 86 includes the same second junction surface 18 as that in the first embodiment on the lower surface. The first holding member 15 includes the first junction surface 17, and the mounting screw 58 is screwed to the screw hole 56, whereby the intermediate mount 86 is fixed to the first holding member 15.

In a state where the second holding member 16 is mounted to the intermediate mount 86, the first junction surface 17 of the first holding member 15 is closely attached to the second junction surface 18, similarly to the first embodiment. Thereafter, the second holding member 16 is moved relative to the first holding member 15, and a shift in the XY plane and rotation around the Z-axis are performed, whereby the emission-side optical axis CL1O of the first optical system of the first holding member 15 and the incidence-side optical axis CL2I of the second optical system of the second holding member 16 are aligned with each other. In a case where the optical axis alignment is completed, the mounting screw 58 inserted into the screw mounting hole 57 is screwed to the screw hole 56, and the intermediate mount 86 is fixed to the first holding member 15.

Figure 8:
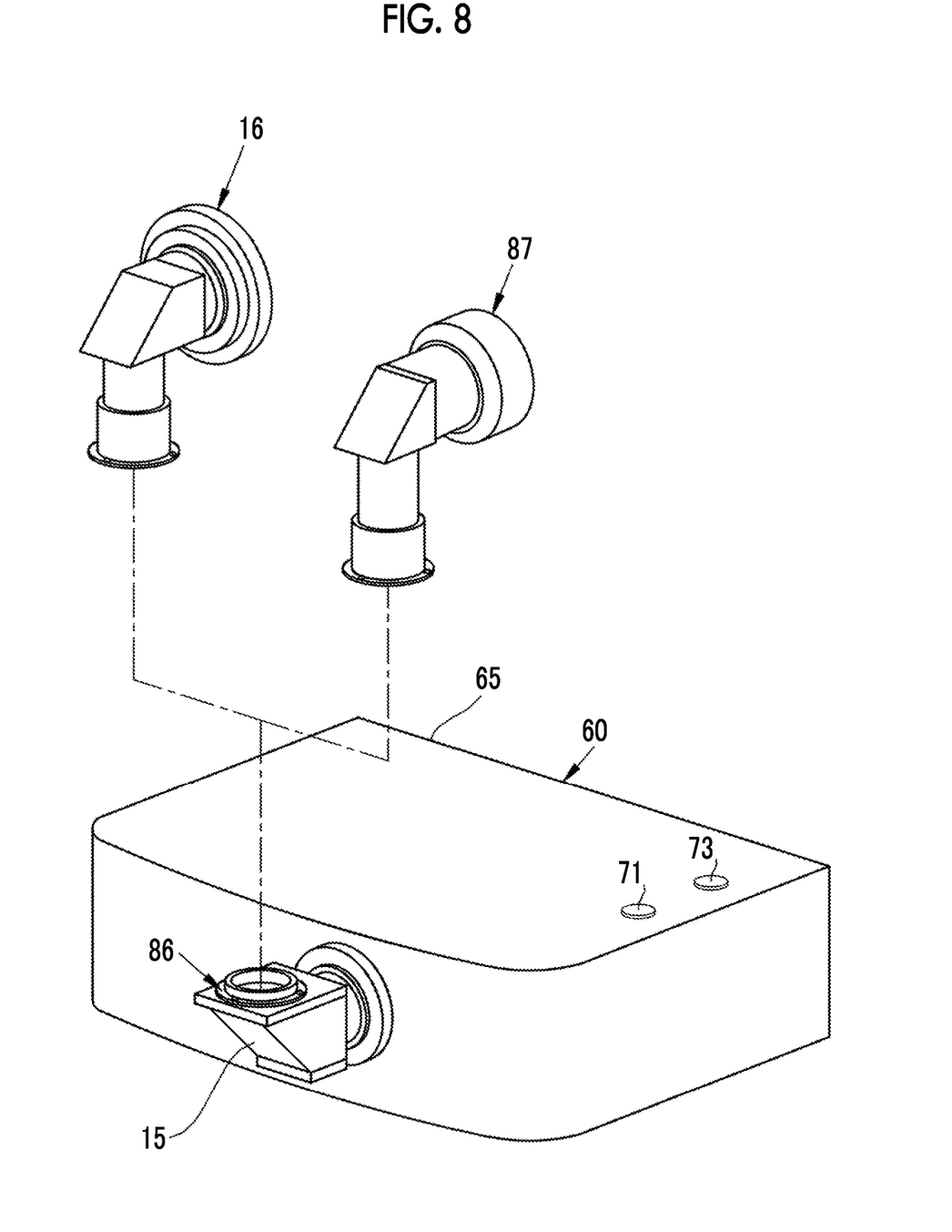
FIG. 8 is a perspective view illustrating replacement between a second holding member and a third holding member in the third embodiment.

At the time of use, similarly to the first embodiment, the first holding member 15 is set up on the mount 61 of the projector main body 60, and thus a projector is assembled. In a case where the projection distance or projection angle of view of a projection lens is changed, as shown in FIG. 8, the second holding member 16 is removed from the intermediate mount 86, and thus a third holding member 87 including a third optical system, for example, having a different projection focal length can be set up on the intermediate mount. In a case of the present embodiment, only the second holding member 16 including the second optical system 12 is replaced by the third holding member 87, and thus the projection distance or the projection angle of view can be easily changed. In addition, the intermediate mount 86 is mounted to the first holding member 15 in a state of optical axis alignment. Therefore, in a case where the third holding member 87 that newly holds another third optical system is set up, new optical axis alignment is not required and thus the time and effort are saved. Meanwhile, optical axis alignment may be readjusted, as necessary, with respect to the third holding member 87 by the intermediate mount 86 being shifted in the XY plane or rotated around the Z-axis with respect to the first holding member 15.

Meanwhile, in the third embodiment, junction between the intermediate mount 86 and the second holding member 16 is detachably performed, but junction between the intermediate mount 86 and the first holding member 15 may be detachably performed. In this case, optical axis alignment is performed between the intermediate mount 86 and the second holding member 16.

Fourth Embodiment

Figure 9:
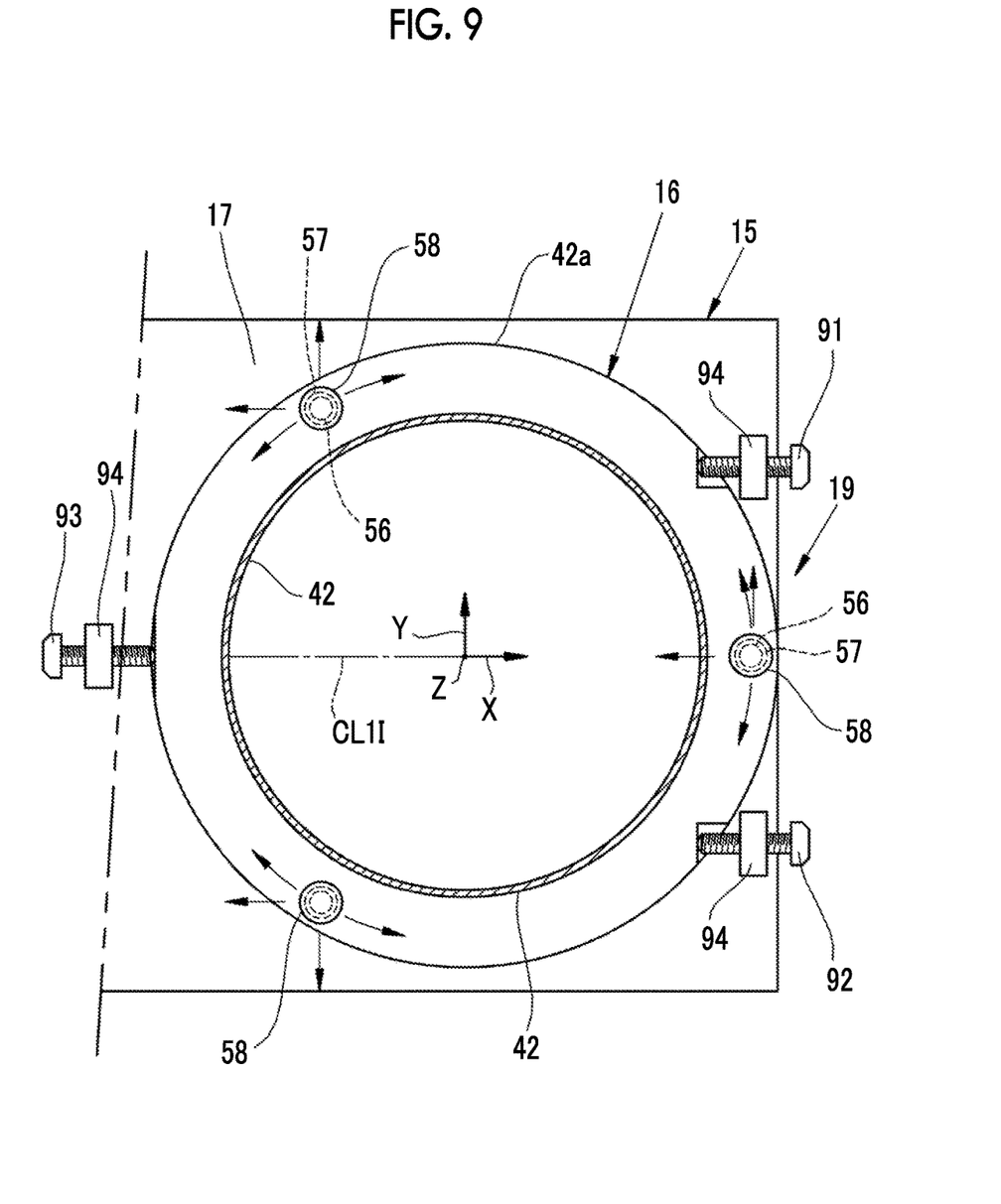
FIG. 9 is a transverse cross-sectional view illustrating the periphery of a junction portion of a fourth embodiment using a fine adjustment screw.

In the respective embodiments, the shift in the XY plane for fine adjustment or the rotation around the Z-axis is performed by moving the second holding member 16 directly, for example, with a hand. On the other hand, in a fourth embodiment shown in FIG. 9, the second holding member 16 is slightly shifted or rotated with respect to the first holding member 15, using fine adjustment screws 91, 92, and 93. The fine adjustment screws 91 to 93 are screwed to a bracket 94. The fine adjustment screws 91 to 93 are advanced and retreated with respect to the bracket 94 by turning these fine adjustment screws 91 to 93, and thus the shift and the rotation can be performed. Meanwhile, the numbers of fine adjustment screws 91 to 93 for shift or rotation and the installation positions thereof may be appropriately changed. In addition, though not shown in the drawings, for example, a gear mechanism or a link mechanism capable of moving the first holding member 15 and the second holding member 16 relative to each other may be used in addition to the fine adjustment screws 91 to 93 and the bracket 94.

In the above embodiment, a transmission-type liquid crystal panel is used as the image forming panel 67, but a reflection-type liquid crystal panel may be used. In this case, the image forming panel 67 has the light source 66 installed on its front side and is irradiated simultaneously with irradiation light beams of three colors of RGB. In addition, in a case where a DMD is used as the image forming panel 67, the light source 66 is installed on the front side of the image forming panel 67, and an LED of three colors of RGB is emitted in a time-division manner in synchronization with a timing at which a three-color image of the DMD is formed.

In the respective embodiments, a description has been given in a state where the projector 62 is installed on a table, but the present invention can be applied even in a case where the projector is used in a state of hanging down from a ceiling or the like. In addition, an example has been described in which an image is projected onto the screen 39, but the projection surface is not limited to the screen 39, and a projector that projects an image onto various projection surfaces can be used.

In the above embodiment, a U-shaped optical path is formed using the first mirror 13 and the second mirror 14, but the first and second junction surfaces 17 and 18 and the junction portion 19 of the present invention may be applied to a projection lens which is configured to form an L-shaped optical path by removing either the first mirror 13 or the second mirror 14. Even in this case, it is possible to provide a projection lens and a projector which are capable of being accurately assembled while achieving a reduction in size, and are capable of widening an angle by reducing a focal length.

EXPLANATION OF REFERENCES

10: projection lens
11: first optical system
12: second optical system
13: first mirror
14: second mirror
15: first holding member
16: second holding member
17: first junction surface
18: second junction surface
19: junction portion
21: first lens
22: second lens
23: image forming surface
24: first main body
24a: lower plate
24b: inclination portion
24c: front plate
24d: first mounting hole
24e: upper plate
24f: second mounting hole
25: mounting cylinder
26: first lens frame
27: second lens frame
28, 29: mounting screw
35: third lens
36: fourth lens
37: fifth lens
38: sixth lens
39: screen
40: second main body
40a: upper plate
40b: inclination portion
40c: lower plate
40d: third mounting hole
40e: flange
41: mounting plate
41a: mounting hole
42: third lens frame
42a: flange
43: fourth lens frame
44: fifth lens frame
46, 47, 48: mounting screw
56: screw hole
57: screw mounting hole
58: mounting screw
60: projector main body
61: mount
62: projector
65: case
66: light source
67: image forming panel
67a: image forming surface
68: control unit
71: zoom dial
73: focus dial
80: intermediate member
80a: intermediate junction surface
81: first mounting screw
82: second mounting screw
83: junction portion
84: screw mounting hole
85: screw hole
86: intermediate mount
87: third holding member
91, 92, 93: fine adjustment screw
94: bracket
101, 102: projector
CL1, CL1I, CL1O, CL2, CL2I, CL2O: optical axis
L1: gap
S: shift ratio
Y: distance

What is claimed is:

1. A projection lens comprising:
a first optical system;
a first optical axis bending member, disposed between the first optical system and an image forming surface of the first optical system, which bends an optical axis;
a second optical system that projects an image formed by the first optical system onto a projection surface;
a second optical axis bending member, disposed in the second optical system, which bends an optical axis;

a first holding member that integrally holds the first optical system and the first optical axis bending member;

a second holding member that integrally holds the second optical system and the second optical axis bending member;

a first junction surface that intersects an emission-side optical axis of the first optical system and is formed in the first holding member;

a second junction surface that intersects an incidence-side optical axis of the second optical system and is formed in the second holding member; and a junction portion which is configured such that, in a state where the first junction surface and the second junction surface are aligned with each other, at least one of the first holding member and the second holding member is capable of being shifted in a direction of both the junction surfaces and rotated around the optical axis with respect to the other holding member, and that a U-shaped optical path is formed by optical axis alignment between an emission side of the first optical system and an incidence side of the second optical system.

2. The projection lens according to claim 1, wherein the junction portion includes a screw hole which is provided in one of the first holding member and the second holding member, a mounting hole which is provided in the other of the first holding member and the second holding member, and a mounting screw, inserted from the mounting hole and screwed to the screw hole, which fixes the first holding member and the second holding member in a state where the first junction surface and the second junction surface are closely attached to each other, and wherein the junction portion is configured such that the first holding member and the second holding member are relatively shifted in the direction of both the junction surfaces and are rotated around the optical axis, within a gap between the mounting hole and the mounting screw.

3. The projection lens according to claim 1, wherein the junction portion includes an intermediate member which is shifted in the direction of both the junction surfaces and is rotated around the optical axis, between the first junction surface and the second junction surface, a first mounting screw that fixes the intermediate member to the first junction surface by performing one of a shift and rotation around the optical axis between the first junction surface and the intermediate member, and a second mounting screw that fixes the intermediate member to the second junction surface by performing the other of a shift and rotation around the optical axis between the intermediate member and the second junction surface.

4. The projection lens according to claim 1, wherein the junction portion includes an intermediate mount which is closely attached to the first junction surface and has the second junction surface, and the second holding member is detachably mounted to the intermediate mount.

5. A projector comprising:

an image forming panel that displays an image;

a light source that illuminates the image forming panel; and the projection lens according to claim 1, which projects illumination light, from the image forming panel illuminated by the light source, onto a projection surface.

6. A projector comprising:

a projector main body including an image forming panel that displays an image and a light source that illuminates the image forming panel; and the projection lens according to claim 1, detachably mounted to the projector main body, which projects illumination light from the image forming panel illuminated by the light source.

7. The projector according to claim 5, wherein the image forming panel is disposed such that a center of the image forming panel is shifted with respect to the optical axis of the first optical system.

8. The projector according to claim 5, wherein the image forming panel is disposed such that a center of the image forming panel is shifted with respect to the optical axis of the first optical system in a direction of the optical axis bent by the first optical axis bending member.

9. The projector according to claim 6, wherein the image forming panel is disposed such that a center of the image forming panel is shifted with respect to the optical axis of the first optical system.

10. The projector according to claim 6, wherein the image forming panel is disposed such that a center of the image forming panel is shifted with respect to the optical axis of the first optical system in a direction of the optical axis bent by the first optical axis bending member.

* * * * *